Aug. 31, 1926.
L. D. KAY
CAST METAL WHEEL
Filed Nov. 4, 1925
1,598,140
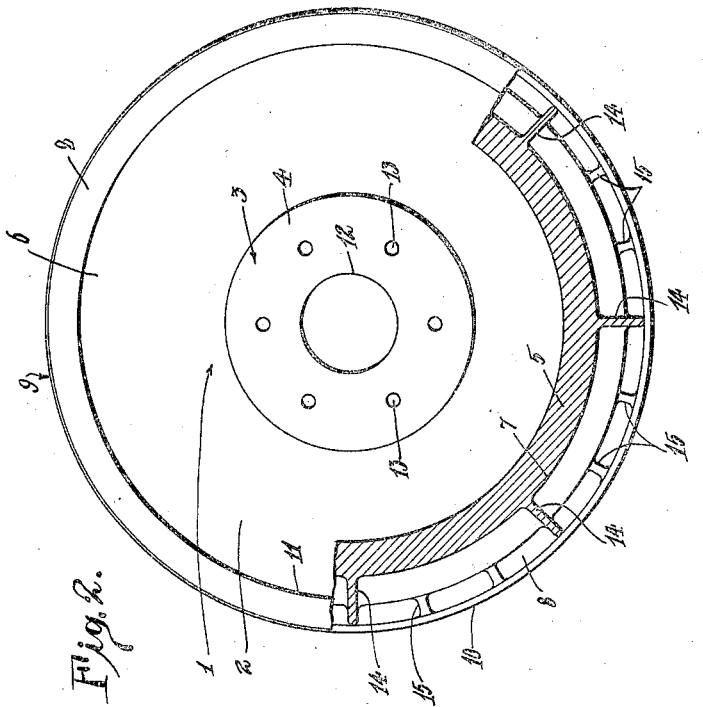
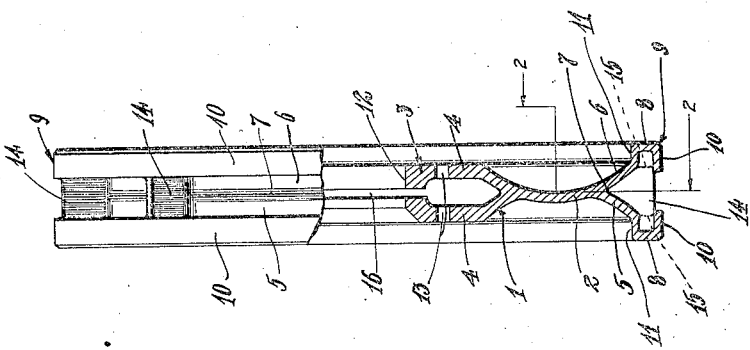
Inventor
Lloyd D. Kay.
By Lyon & Lyon
Attorney Patented Aug. 31, 1926.

1,598,140

UNITED STATES PATENT OFFICE.

LLOYD D. KAY, OF LOS ANGELES, CALIFORNIA.

CAST-METAL WHEEL.

Application filed November 4, 1925. Serial No. 66,739.

This invention relates to cast metal wheels and while the invention is applicable to the construction of cast iron wheels, it is especially useful in the construction of wheels to be cast of steel.

The general object of the invention is to produce a wheel of the disk type which will be relatively light and which will effectively support its load; also to provide a wheel of this type which in cooling will avoid developing internal stresses in the metal.

Further objects of the invention will appear hereinafter.

The invention consists of the novel parts and combination of parts to be described hereinafter, all of which contribute to produce an efficient cast metal wheel.

A preferred embodiment of the invention is described in the following specification, while the broad scope of the invention is pointed out in the appended claims.

In the drawings:—

Figure 1 is a front elevation and partial section through a wheel embodying my invention.

Fig. 2 is a side elevation and section through the wheel, the said section being taken about in the plane of the line 2—2 of Figure 1.

In practicing my invention I provide a body 1 for the wheel which is of disk type and which preferably is formed of a dished disk 2; that is to say in cross section on the radial line the disk will present a concavo-convex form, see Figure 1. The wheel includes a hub portion 3 which consists of two separated webs 4 which are united integrally to the body 1. At its outer portion the body 2 is provided with an integral web 5 which extends continuously around the wheel and this web diverges from the edge portion 6 of the disk of the wheel so as to form a V-shaped notch 7 which extends continuously around the wheel. This web 5 and the edge 6 of the wheel disk terminate in extensions 8 which project outwardly, that is to say, they are preferably disposed in a plane substantially at right angles to the axis of the wheel. These extensions co-operate with each other to form the rim 9 of the wheel. I prefer, however, to construct this rim 9 of open rectangular cross section, that is to say, it is of box form. For this purpose I prefer to provide the extensions 8 with flanges 10 which project toward each other and which are of cylindrical form, that is to say, they extend toward the middle portion of the wheel and cooperate to produce the tread of the wheel upon which the tire rim may be mounted. The web 5 and the portion 6 of the wheel are connected to the extensions 8 through rim members 11 which extend continuously around the wheel.

The hub portion 3 is provided with a central opening 12 to receive a separate hub or the arm of an axle. This opening 12 may be bored to a suitable diameter.

In order to prevent the development of internal strains or stresses in the wheel in cooling, I prefer to leave the webs 3 unconnected with each other at the opening or bore 12.

The hub portion may be provided with suitable bolt openings 13 to make any suitable attachment to the wheel.

The rim of the wheel preferably includes a plurality of transverse bridge-webs 14 which connect the web 5 with the edge portion 6 of the disk of the wheel and these bridge-webs also extend out under the inner sides of the flanges 10.

At a plurality of points between these bridge-webs I provide small ribs 15 which integrally connect the flanges 10 with the extensions 8 and with the rim members 11. These ribs operate to give considerable support to the flanges 10 between the bridge-webs 14 and also operate to impart the load stresses to the rim members and to the portions 5 and 6 of the wheel, thereby relieving the stresses in the extensions 8.

By reason of the fact that the webs 4 are unconnected to each other at the hub a continuous gap 16 is formed which extends around the center opening 12. In other words this gap divides the hub at an intermediate point.

With a wheel constructed in this way it will be noted that I utilize the inherent strength of a concavo-convex disk but without involving a displacement laterally of the plane of the wheel. In other words, I form a disk body of concavo-convex form and then build on the hub portion and rim of the wheel integral extensions in such a way that the middle plane of the wheel passes substantially tangentially to the curve of the disk when viewed in cross section.

It is understood that the embodiment of the invention described herein is only one of the many embodiments this invention may take, and I do not wish to be limited in the practice of the invention, nor in the claims, to the particular embodiment set forth.

What I claim is:—

1. A cast metal wheel of disk type having a body consisting of a disk with a hub portion formed of two separated webs connected integrally with the body, said hub portion having a central opening therethrough to receive a separate hub or the arm of an axle, said webs being unconnected to each other at said central opening, said wheel having annular rim members connected integrally to said body with extensions projecting away from the axis of the wheel and having flanges projecting toward the middle plane of the wheel.

2. A cast metal wheel of disk type having a body consisting of a disk with a hub portion formed of two separated webs connected integrally with the body, said hub portion having a central opening therethrough to receive a separate hub or the arm of an axle, said webs being unconnected to each other at said central opening, said wheel having annular rim members connected integrally to said body with extensions projecting away from the axis of the wheel, and having flanges projecting toward the middle plane of the wheel, and transverse bridge-webs disposed at a plurality of points around the wheel and integrally uniting said rim members.

3. A cast metal wheel of disk type having a body consisting of a disk with a hub portion formed of two separated webs connected integrally with the body, said hub portion having a central opening therethrough to receive a separate hub or the arm of an axle, said webs being unconnected to each other at said central opening, said wheel having annular rim members connected integrally to said body with extensions projecting away from the axis of the wheel having inwardly projecting flanges, transverse bridge-webs disposed at a plurality of points around the wheel and integrally uniting said rim members, and a plurality of ribs disposed between the bridge-webs and integrally connecting the flanges with the rim members.

4. A cast metal wheel of disk type having a body consisting of a dished web and having a hub portion consisting of two separated webs and united integrally to the body, said body having a web extending continuously around the same and diverging from the dished portion of said body, said last named web and the outer edge of the dished portion of said body having integral rim members with extensions extending away from the axis of the wheel and cooperating to form a rim for the wheel.

5. A cast metal wheel of disk type having a body consisting of a disk portion of concavo-convex cross section, the middle plane of the wheel lying substantially tangent to the curved portion of the disk, a hub portion composed of two webs, one of which connects integrally to the concavo-convex disk at its inner edge and the other of which connects integrally to the convex side of the disk near its inner edge, the outer edge of said concavo-convex disk portion terminating in a rim member, and a rim web connected integrally to the convex side of the disk and cooperating with the edge of the disk to form a substantially V-shaped groove extending continuously around the wheel, said rim web terminating in a rim member cooperating with the first named rim member to form a seat for the tire rim.

6. A cast metal wheel of disk type having a body consisting of a dished web and having a hub portion consisting of two webs and united integrally to the body, said body having a web extending around the same and diverging from the dished portion of said body, said last named web and the outer edge of the dished portion of said body having integral rim members with extensions extending away from the axis of the wheel and cooperating to form a rim for the wheel.

Signed at Los Angeles, California, this 29th day of October, 1925.

LLOYD D. KAY.